United States Patent [19]

Leggett

[11] Patent Number: 5,377,315
[45] Date of Patent: Dec. 27, 1994

[54] REGENERATION OF PROCESS CONTROL FLOW DIAGRAMS FOR PROGRAMMABLE LOGIC CONTROLLERS

[76] Inventor: Andrew G. Leggett, P.O. Box 26013, 21 Essa Road, Barrie, Ontario, Canada, L4N 7N3

[21] Appl. No.: 956,979

[22] Filed: Oct. 6, 1992

[51] Int. Cl.$^5$ ............................................. G06F 15/62
[52] U.S. Cl. ..................................... 395/140; 364/140; 364/141; 395/161
[58] Field of Search ............... 395/140, 145, 149, 161, 395/700; 364/DIG. 2, 140, 141

[56] References Cited

U.S. PATENT DOCUMENTS

| | | | |
|---|---|---|---|
| 3,686,639 | 8/1972 | Fletcher et al. | 395/161 X |
| 3,800,288 | 3/1974 | Russell et al. | 395/149 |
| 5,005,152 | 4/1991 | Knutsen | 364/DIG. 2 |
| 5,019,961 | 5/1991 | Addesso et al. | 395/161 X |
| 5,113,359 | 5/1992 | Kiya et al. | 395/161 X |
| 5,117,372 | 5/1992 | Petty | 395/161 |

OTHER PUBLICATIONS

"Distributed Control Systems" by M. P. Lukas, pub. MacMillan ISBN 0-442-26060-2, pp. 19-73 and 232-235. (1986).

"Distributed Process Control for Industrial Automation", by Poponic & Bhaktar, pub. Marcal Dekker Inc, 1990, ISBN 0-8247-8118X, pp. 235-247, 334-337, 566-575.

*Primary Examiner*—Heather R. Herndon
*Assistant Examiner*—Almis Jankus
*Attorney, Agent, or Firm*—Ridout & Maybee

[57] ABSTRACT

A method is provided for the regeneration of process control flow diagram for a programmable logic controller programmed using function blocks. It includes the steps of decompiling object code of a program of the controller to generate a listing of data concerning functions of the programmed controller, logic blocks implemented by the programmed controller, and connections and any operating parameters of those logic blocks; identifying logic blocks representing external inputs and outputs of the programmed controller; establishing a sheet data file and making it a current sheet data file; tracing and tabulating function blocks and their connections successively from each external output back towards the external inputs while placing data relative to the function blocks and their connections in the current sheet data file, eliminating duplicated entries; monitoring the amount of data placed in the sheet data file, and, whenever the amount of data in the current sheet data file reaches a level that inclusion of further data would result in overcrowding if represented on a single drawing sheet, establishing an additional sheet data file which replaces, as current sheet data file, the sheet data file last established; including, each time an additional sheet is established, in the last established and additional sheet data files respectively, input and output references respectively for connections between function blocks tabulated in the two sheet data files; scanning the data placed in the sheet data files to locate duplicated output references and removing those references from the sheet data files; and individually converting each sheet data file into a drawing file by calculating and adding, based on the content of that sheet data file, data as to location of function blocks and connection lines within a sheet to which that file relates, and descriptive data as to content of that sheet.

3 Claims, 4 Drawing Sheets

REGENERATION OF PROCESS CONTROL FLOW DIAGRAMS FOR PROGRAMMABLE LOGIC CONTROLLERS

BACKGROUND OF THE INVENTION

FIELD OF THE INVENTION

This invention relates to the regeneration of process control flow diagrams for programmable logic controllers.

Distributed process control systems, widely used in many industrial applications, make widespread use of programmable logic controllers, PLCs, otherwise known as LCUs (logic control units). In order to provide for programming of such controllers by or under the supervision of process control engineers who may not possess computer programming skills, techniques for configuring controllers without the use of conventional programming languages have been developed. A common approach is to utilize objects known as function blocks to define the control system configuration to be implemented in an LCU. This approach is described in some detail in the book "Distributed Control System", M. P. Lukas, published by MacMillan, ISBN 0-442-26060-2, pages 19–73 and 232–235. Further information, exemplified by reference to commercially available systems, is to be found in the book "Distributed Process control for Industrial Automation", Popovic & Bhatkar, Marcel Dekker Inc., New York, 1990, ISBN 0-8247-8118-X, especially pages 235–247, 334–337, and 566–575.

Initial programming of a PLC using function blocks commonly takes place off-line at a computer work station, using a computer aided design (CAD) program which enables an engineer to produce symbolic drawings which both provide a visually comprehensible display or printout in the form of a drawing, and a drawing file which can be displayed or printed, or compiled to generate object code for installation in the PLC. In practice, however, the resulting code must be debugged and tuned interactively and on-line utilising utilities provided for the purpose, which are capable patching the object code in situ; such utilities typically include a limited decompilation capability in order to facilitate patching. A major problem which arises from this combination of off-line and on-line programming is that of maintaining consistency between record copies of the original drawings and the actual programming of the PLCs to which they relate. If the record copies are not meticulously updated whenever an alteration is made to the object code, they will not accurately reflect the programming of the PLC, and even with rigorously supervised updating procedures there is no positive assurance of correspondence between the drawings and the object code. In practice, updating of record copies is a slow, labour intensive and expensive procedure.

As mentioned above, utilities providing limited decompilation capabilities are available, but as is well known, decompilation or disassembly of object code to provide meaningful source code is extremely difficult and time consuming since much of the information in the original source code which makes it human-comprehensible is discarded during compilation and unless implicit in the object code, is lost and cannot be regenerated. This is particularly true of symbolic and object oriented languages which are designed to assist the programmer or user and facilitate modification, and therefore contain a large amount of data which is redundant when object code is generated. In the case of function-code programming using CAD drawings, conventional decompilation enables the individual function codes, their inputs and outputs and associated parameters to be recognized, so that they can be amended or checked against the original drawings, but the layout and arrangement of the drawing is wholly lost. To the best of applicant's knowledge, no satisfactory system for regenerating the original CAD files used in function block programming exists which does not require massive human intervention to regenerate the data lost during compilation.

SUMMARY OF THE INVENTION

I have now determined that it is possible to regenerate conventional function code CAD files from PLC object code, leaving no more than a minor necessity for human intervention to resolve residual queries, by adopting a double-ended approach to regeneration. Thus the object code is first analyzed to determine its content in terms of function blocks and external inputs and outputs, a structure of CAD files adjusted to accommodate that specific content is reestablished, and the information content of the object code is then inserted into that file structure.

It should be appreciated that regeneration of the process control diagrams which form the symbolic source from which the object code for a PLC is generated is not simply a matter of decompiling the object code. When the source code is compiled, the types of function blocks symbolically represented in the original drawing files are identified and translated into code representing identification of a routine implementing a block of the identified type, associated with parameters to be passed to the routine, and the identification of inputs and outputs associated with the block concerned. This code determines the operating configuration of the PLC, and in conjunction with a library of routines implementing the function blocks and a real time operating system of the PLC provides a control program which can execute in the PLC to respond to external inputs to the system to control outputs in one or more control loops. Decompilation will therefore regenerate raw data relating to each function block within the system, namely its type, its operating parameters, if required by the type of block concerned, its input connections, and the types of these connections (analog or logical). The compiled program will normally contain additional data, for example identifying the program, and this can also be regenerated by decompilation. The invention is essentially concerned with utilizing the regenerated data to construct CAD drawing files.

A method for the regeneration of process control flow diagrams for a programmable logic controller programmed using function blocks, comprises decompiling object code of a program of the controller to generate a listing of data concerning the function of the programmed controller, the logic blocks implemented by the programmed controller, and the connections and any operating parameters of those logic blocks; identifying logic blocks representing external inputs and outputs of the programmed controller; establishing a sheet data file and making it a current sheet data file; tracing and tabulating function blocks and their connections successively from each output back towards the inputs whilst placing data relative thereto in the current sheet data file, eliminating duplicated entries; monitoring the amount of data placed in the sheet data file, and, as the amount of data in the current sheet data file becomes too large to ensure convenient representation on a single drawing sheet, establishing an additional sheet data file which replaces, as current sheet data file, the sheet data file previously established; including, in the previously established and new sheet data files respectively, input and output references respectively for connections between function blocks tabulated in the two sheet data files; scanning the data placed in the sheet data files to locate duplicated output references and removing those references from the sheet data files; and individually converting each sheet data file into a drawing file by calculating and adding, on the basis of the content of that sheet data file, data as to the location of function blocks and connection lines within the sheet to which that file relates, and descriptive data as to the content of the sheet.

SHORT DESCRIPTION OF THE DRAWINGS

The invention is described further with reference to the accompanying drawings, in which:

FIGS. 1A, 1B and 1C, and FIG. 2 are flow diagrams illustrating the regeneration process of the invention.

DESCRIPTION OF THE PREFERRED EMBODIMENT

The regeneration process consists of several passes, each of which except a first processes the output of a preceding pass.

Figure 1A:
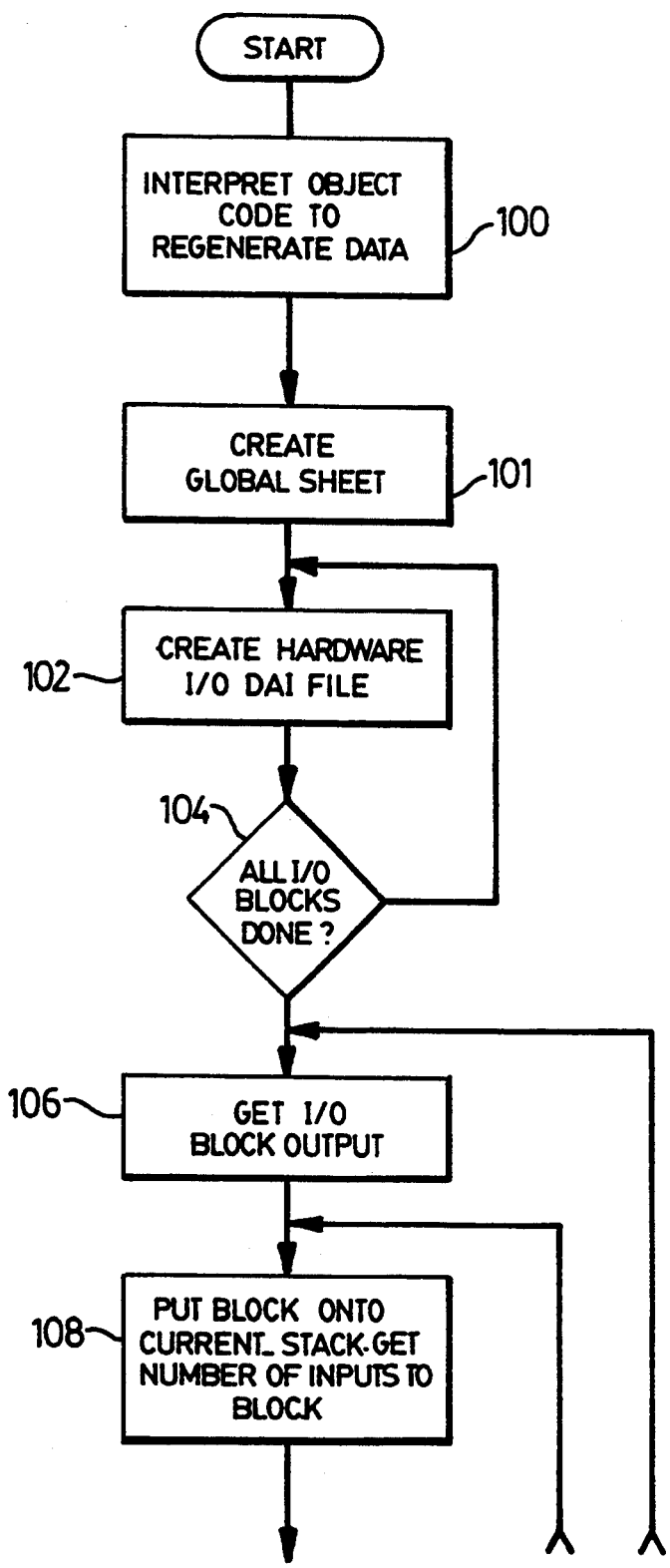
Figure 1B:
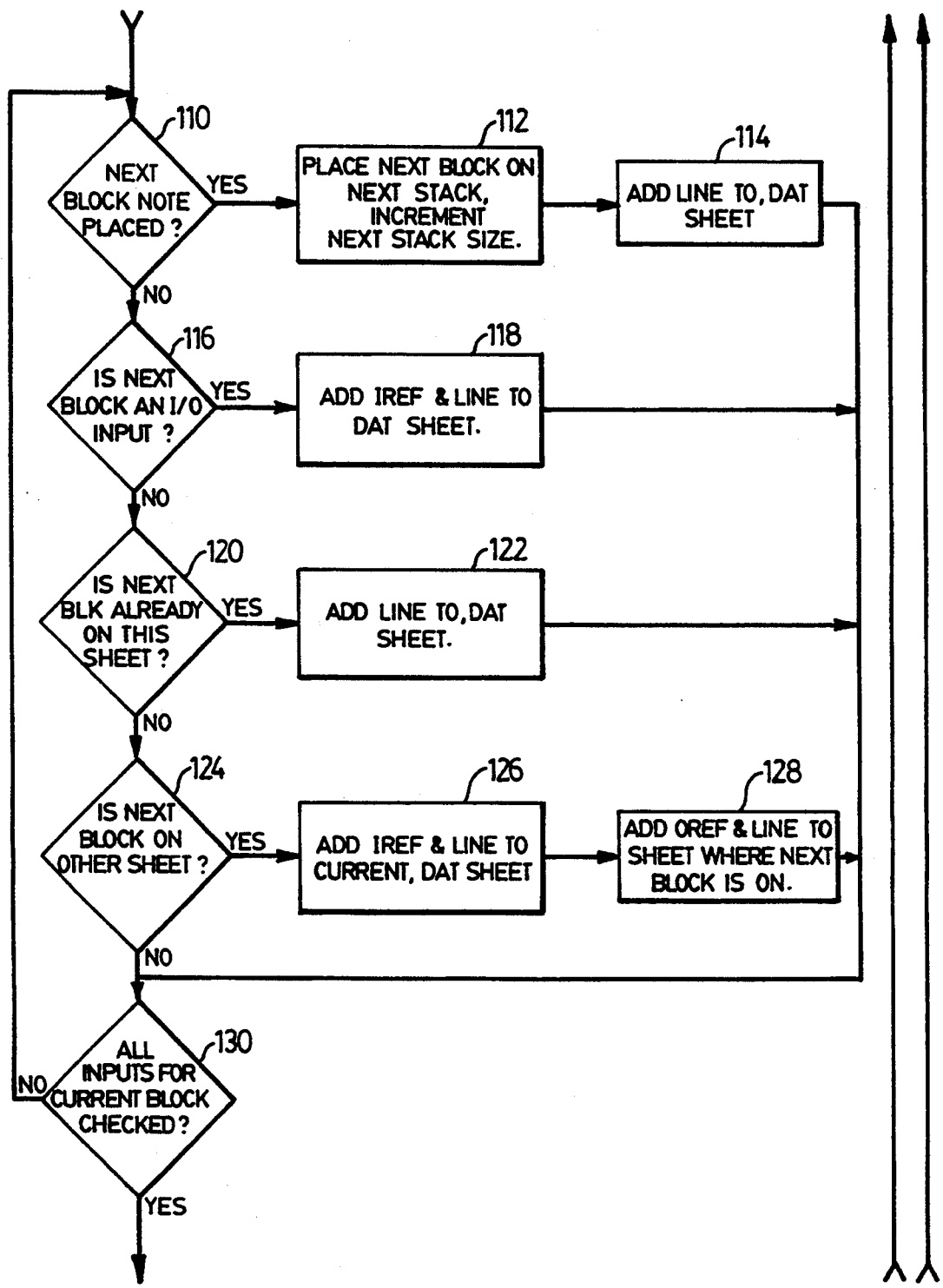
Figure 1C:
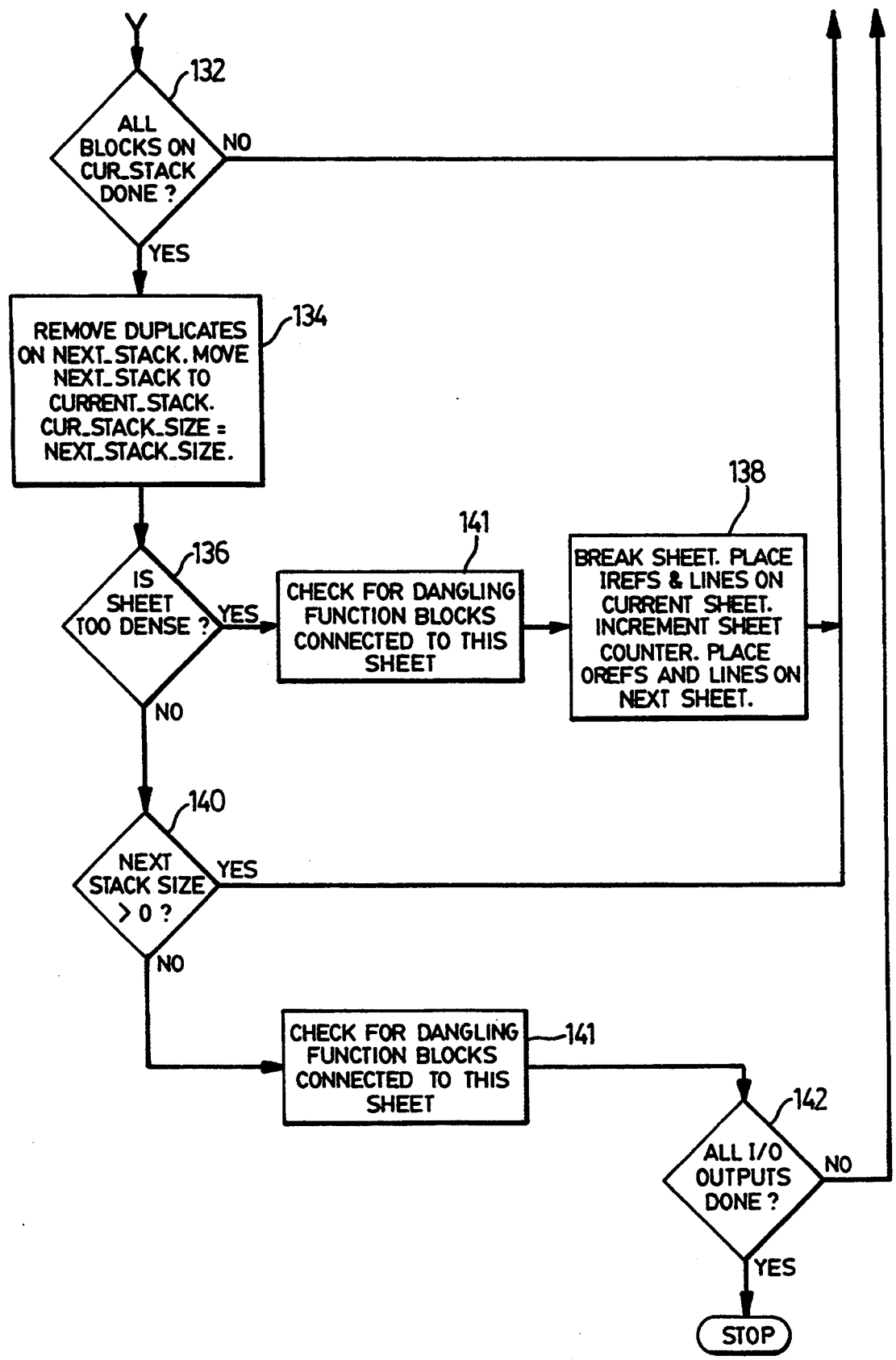

Referring to FIGS. 1A, 1B and 1C, which together show a flow diagram of the first pass (Pass 1), this commences with interpretation of the object code to regenerate the data discussed above to create a single file, containing all of this data in raw form (block 100 in the flow diagram). The data is reviewed to extract data representing global information concerning the functions implemented by the PLC, which is placed in a data file used to form the basis for a Global sheet, generally the first sheet, of the reconstituted drawings (block 101 in the flow diagram). This and the remaining data is regenerated by comparing the code with a library file written to contain appropriately organized data as the characteristics of each type of function block which may occur in the object code, and the manner in which associated data is stored. The details of the processing will vary according to the operating system and the function block library implemented in the PLC and its details form no part of the present invention, except that the library file should be written and processing should be implemented to organize its output data in a format compatible with following steps in the process. The configuration object file will consist of binary fields containing the configuration data, and the field structure of the file and the protocols used to encode the data must be known in order to enable the data to be recovered. Conventionally the field definitions, and the definitions of the available function block types are provided in a table for use in the regeneration process, the function block definitions including naming structures, input and output definitions, default parameters, and location of input and output parameters. In addition, data must be included in the table, for use in the following stage of the process, identifying which function block types provide hardware input or output interfaces.

In this following stage, steps 102 and 104, the data relating to function blocks forming the configuration object file is reviewed to identify blocks of types providing hardware (I/O) inputs or outputs to the PLC. After verifying that each block providing a hardware output does receive an input from another block, and each block providing a hardware input does provide an output to another block, i.e. that the blocks do form active parts of the system being implemented, these external input and output blocks are separately tabulated in a data file. This verification allows for the possibility that inputs or outputs have been eliminated as active components, i.e. connected by the line to other blocks in the PLC, during tuning or modification of the configuration file whilst redundant code relating to them remains in the configuration file.

The next portion of the process traces the relationships between the function blocks, and determines how they should be allocated to one or more drawing sheets, an array or allocation file being generated which lists the function blocks and their sheet allocations as they are placed. Conveniently, these allocations are by sheet number, with a negative number such as −1 indicating that a block has not been placed. Processing commences by opening a new file (which for purposes of description will be assumed to have the extension .DAT) for data relating to a first sheet to be regenerated, taking the first output from the table of output blocks (step 106), placing it upon the first of two stacks (the "current" stack) (step 108), and referring to the data relating the source of a first of its inputs. If it is determined (step 110) that this block (the "next" block) is a block which has not yet been placed, then that block is placed upon the second stack (the "next" stack) (step 112) and a line of data defining that input in terms of line type (e.g. logical or analog), source and destination is added to the .DAT file (step 114) which already includes an output reference (OREF) to the output block, and the data relating to that block. Having dealt with that input, the program determines (step 130) whether all inputs to the block have been checked and, if not, loops back to step 110. If this step determines that the block to which the next input connects has not been placed (as will be the case at this stage in the process), steps 112, 114 and 130 are repeated until all inputs have been checked.

A following step 132 removes the block from the current stack and checks whether the inputs of all of the blocks on the current stack have been checked, which at this stage will be the case since the only one block on the stack has been checked and removed. Execution thus proceeds to step 134 in which the next stack is examined, duplicate entries are removed, and the contents of the next stack are placed on the current stack. At this point (step 136), a check is made to determine whether the data accumulated in the .DAT file indicates that the resulting sheet will be too dense.

If the result of this check is positive (i.e. inclusion, in the existing sheet to which the .DAT file relates, of function blocks from which inputs are being processed, would result in overcrowding of the sheet), a new sheet data (.DAT) file is established in a step 138 to contain such blocks. The input lines being defined in the existing .DAT file, and which extend to the blocks on the new sheet, are labelled with an input reference which is included in the definition of the destination block in the existing file. Likewise, the definitions of the blocks on the new sheet are provided with OREFs which are used to label the corresponding line in that sheet file.

As processing continues, blocks will be found to have inputs from blocks which are either hardware (I/O)

inputs, a block already located on the same .DAT file, or a block already located in another .DAT file. In the first instance, an appropriate IREF and line data are added (step 118) to the present .DAT file and execution moves to step 130. In the second instance, appropriate line data is added to the current .DAT file, and execution moves to step 130. In the third instance, an IREF and appropriately labelled line data are added to the current .DAT file, and an OREF and appropriately labelled line data are added to the .DAT file in which the originating block is located, and execution again moves to step 130.

When all of the entries in the current stack have been processed, and the "next" stack is also found to be empty (step 140), this indicates that the particular I/O block output being processed has been fully traced. At this point the program tests (step 142) whether all I/O block outputs have been processed, and either returns to step 106 if there are further outputs to process, or exits from the routine, marking the end of the first pass.

Since the processing discussed above proceeds from the outputs towards the inputs, it will not detect so-called "dangling blocks", that is function blocks which have input lines but no output lines. Whilst such blocks may arise through the deletion of outputs during modification of the PLC code, more usually such blocks form a useful part of the system, often providing output data by means which the system can be monitored by an operator, although such output data is not utilized directly for control purposes by the PLC and thus is usually not designated by an output line. Each sheet data file produced by the first pass is thus completed by testing for the presence of dangling function blocks referenced to function blocks allocated to the file, and adding data relating to such dangling blocks, i.e. blocks having inputs referenced to blocks in the file but not otherwise referenced. Conveniently the routine 141 to perform this test is performed prior to breaking a sheet (step 138) or upon completion of analysis of an I/O output prior to step 142, in each case as the last step in collecting data for a sheet before a new sheet is started or the process ends. It could also be performed as part of the second pass discussed below.

Although the insertion of data relating to dangling blocks may occur after a determination that a sheet has been filled as far as desirable, this should not cause a problem. The output to input progress of the process for allocating data to sheets tends to produce a data tree which when plotted on a sheet will branch from one side towards the other, whereas dangling blocks will be represented by branching in the opposite direction which is readily accommodated.

A typical format for the sheet data or .DAT files is exemplified below in Table 1. It contains in an English language style data to be used in the construction of one sheet of the reconstructed flow diagram.

TABLE 1

```
NORML:
OREF:   BLK 205
LINE:   0 TYPE:   5 SOURCE:   BLK   205 OUTPUT#:   1 DEST:   OREF BLK   205
FC:  80
BLOCK:   205 2 4
31 2026.000000 5.000000 2060.000000 5.000000 0.000000 5.000000 4000000.000000 −4000000.000000
4000000.000000 100.000000 0.000000 44.000000 −5.000000 0.000000 44.000000 255.000000 0.000000
0.000000 0.000000 0.000000 0.000000 0.000000 0.000000 0.000000 0.000000 0.000000 0.000000
0.000000 0.000000 0.000000 60.000000
IREF:   BLK 2026
LINE:   1 TYPE:   5 SOURCE:   IREF BLK   2026 DEST:   BLK   205 SPEC#:   1
LINE:   2 TYPE:   5 SOURCE:   BLK   2060 OUTPUT#:   1 DEST:   BLK   205 SPEC#:   3
FC:  19
BLOCK:   2060 4 1
12 2026.000000 206.000000 205.000000 207.000000 1.000000 1.000000 0.000000 0.000000 105.000000
−5.000000 0.000000 0.000000
LINE:   1 TYPE: 5   SOURCE: IREF BLK   2026 DEST: BLK   2060 SPEC#:   1
LINE:   2 TYPE: 5   SOURCE: BLK   205 OUTPUT#:   2 DEST: BLK   2060 SPEC#:   2
LINE:   3 TYPE: 5   SOURCE: BLK   205 OUTPUT#:   1 DEST: BLK   2060 SPEC#:   3
LINE:   4 TYPE: 6   SOURCE: BLK   205 OUTPUT#:   3 DEST: BLK   2060 SPEC#:   4
```

The first line of the .DAT file contains a file header. This describes to what kind of sheet this file relates. This can be one of 4 types:

NORML: A normal sheet containing blocks and lines of a normal program loop, but not contracting I/O input or output references interfacing with the actual process.

HARDWARE I/O: A hardware I/O sheet for function codes responsible for interfacing with hard wired signals to the actual process. The .DAT files generated as described above which contain I/O input or output blocks are hardware I/O files.

GLOBAL: A single sheet (normally the first sheet) which contains global information about the functions of the PLC. Such global information is recovered and allocated to this sheet during step 100.

There may be also sheets with inputs from an additional computer program that may be incorporated in the PLC as well as the function block program being analyzed.

SPARE BLOCKS: A sheet with spare function blocks without either input or output lines connected.

The rest of the information in the .DAT file contains information about the function blocks, all input and output signal continuation references and the type of lines connecting the various parts together.

Function blocks are given an FC: header (dangling blocks having no output lines are given an FD: header). The following is an example:

```
FC: 19
BLOCK: 2060 4 1
12 2026.000000 206.000000 205.000000 207.000000 1.000000 1.000000 0.000000 0.000000
```

```
                                    -continued
105.000000  −5.000000  0,000000  0.000000
```

In this example, the function block is function class (FC) number 19. It occupies address 2060 in memory, has 4 line inputs to it and has 1 output line from it. The next group of numbers describes the values for the numeric inputs for the block. It has in this instance 12 values for input, of which the values follow; not all inputs have lines associated with them, since they may be functional parameters or inactive.

```
Lines may be defined in the .DAT files as follows:
LINE: 2 TYPE:   5 SOURCE: BLK   205 OUTPUT#:   2 DEST:   BLK   2060 SPEC#:   2
```

In this example, the line is the 2nd line connected to the destination block. It is a type 5 line meaning it is a solid (or analog) line. (A type 6 line is a dashed (or logical) line). The start and finish points are highlighted next. This line starts at block number 205 (memory address), being output #2 on block #205 and goes to block 2060 input #2.

Input and Output signal continuation references are simply labelled as follows:
OREF: BLK 205
IREF: BLK 2060

In the example there is an output reference called BLK 205 and an input reference called BLK 2026.

Function blocks which occur in the original decompiled data but are not referenced during the foregoing analysis are spare blocks and are allocated to a .DAT file for a "spare block" sheet (or sheets), labelled as such.

The output to input processing sequence utilized by the first pass tends to generate duplicate output signal continuation references in sheets produced by step 138. A second pass through the .DAT files generated by the first pass searches for and eliminates such duplicate output signal continuation references (OREFs) so that no more than one such reference exists for each output.

Figure 2:
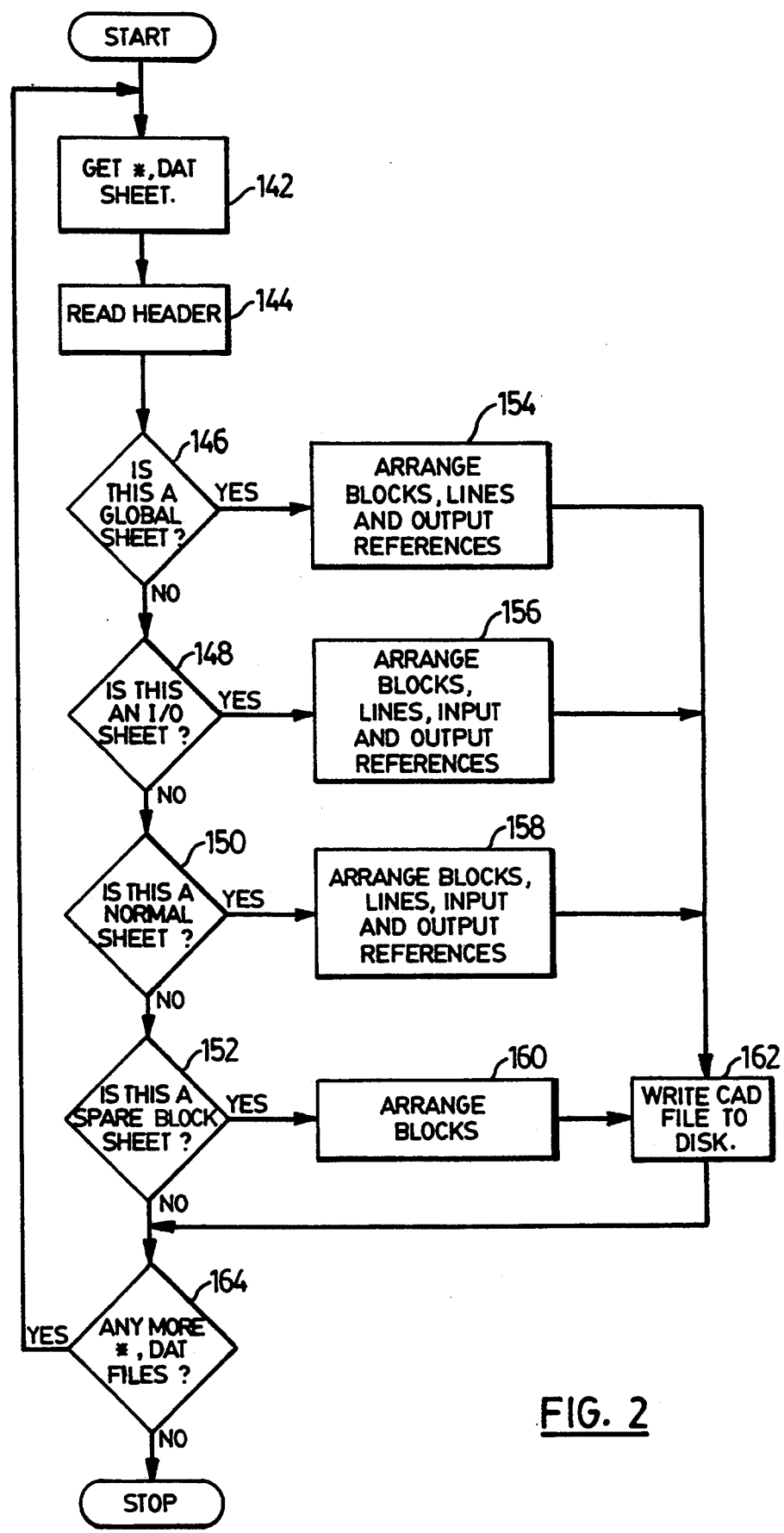

After the second pass, the .DAT files contain the basic data which is determinative of the ultimate content of each sheet of drawing. The third pass arranges this data on the sheet, and generates further data dependent upon the sheet content, as will be better apparent from the following discussion with reference to FIG. 2, which is a flow sheet of a third pass executed as part of the method of the invention.

In this pass, a .DAT file is read (step 142), and the file header is read (step 144) to identify the type of sheet (steps 146, 148, 150, 152) to which the file relates. In the case of a global sheet, a drawing file is generated of a predetermined format appropriate to the function block programming system for which the drawings are required, and the available data is inserted at appropriate points within this format (step 160). In the case of a "spare block" sheet, representations of the blocks are simply arranged in a drawing file of suitable format.

Hardware (I/O) and Normal sheets require somewhat more elaborate handling (step 156 or 158). Typically this involves the following steps in generating the drawing file. Block placement data is generated so that function blocks included in the .DAT file are located on the sheet in a sensible relationship to related input and output references and so as to avoid overlaps and leave enough room between them for lines. Placement data is generated for IREFs (conventionally on the left of the sheet) and OREFs, conventionally on the right of the sheet. The lines are then placed utilizing an auto-routing routine to generate location data for the lines, for example as follows. Different line types, for example solid lines for analog signals and broken lines for digital or boolean signals, are identified by suitable data, and line location data is generated so that (a) lines do not overlap each other or a function block, (b) lines only cross perpendicular to one another, and (c) only one line may connect to a function block input or an OREF, whilst (d) multiple lines may connect either to a function block output or an IREF, or may branch from such an output or IREF. The description of any line which cannot be placed by this routine is placed in a special file so that it may subsequently be placed manually by an operator. Data concerning the features represented in the drawing for which the drawing file is being prepared is drawn from a database, which also lists details of function block types and describes their function; data from this database is included in the drawing file for placement in the drawing as required by the conventions of the programming system with which the drawing is to be utilized.

On completion of a step 154, 156, 158 or 160, the drawing file generated is stored, typically by being written to disk (step 162) and the routine then tests (step 164) whether there are further .DAT files to be processed.

The tasks to be carried out by the third pass have a memory usage that may require them to be divided between two passes. In this event, a fourth pass may carry out some of the data insertion routines, and generate a report listing lines whose placement presented a problem, and output an index file of each function block found in the original object file, and the drawing file in which it has been placed, using data generated during processing as described above.

I claim:

1. A method for the regeneration of process control flow diagrams for a programmable logic controller programmed using function blocks, comprising decompiling object code of a program of the controller to generate a listing of data concerning functions of the programmed controller, logic blocks implemented by the programmed controller, and connections and any operating parameters of those logic blocks; identifying logic blocks representing external inputs and outputs of the programmed controller; establishing a sheet data file and making it a current sheet data file; tracing and tabulating function blocks and their connections successively from each external output back towards said external inputs whilst placing data relative to the function blocks and their connections in the current sheet data file, eliminating duplicated entries; monitoring the amount of data placed in the sheet data file, and, whenever the amount of data in the current sheet data file would result in overcrowding if represented on a single drawing sheet, establishing an additional sheet data file which replaces, as current sheet data file, the sheet data file last established; including each time an additional sheet data file is established, in the last established and additional sheet data files respectively, input and output references respectively for connections between function blocks tabulated in the two sheet data files; scanning the data placed in the sheet data files to locate duplicated output references and removing those references from the sheet data files; and individually converting each sheet data file into a drawing file by calculating and adding, based on content of that sheet data file, data as to location of function blocks and connection lines within a sheet to which that file relates, and descriptive data as to content of that sheet.

2. A method according to claim 1, including a step of locating dangling function blocks referenced to function blocks tabulated in each sheet data file, and tabulating any such dangling function blocks in that file.

3. A method according to claim 1, wherein the tracing and tabulating of function blocks comprises establishing a current stack, tabulating a block referenced by an output on the current stack, placing data related to that block in the current sheet data file while tabulating blocks referenced by inputs to that block on a next stack, except data relating to such blocks which has already been placed in a sheet data file, placing data in that file related to each block on the current stack, transferring blocks from the next stack to the current stack whenever data from all blocks on the first stack has been placed in the file, and continuing until all blocks referenced by outputs have been tabulated and the next stack is empty.

* * * * *